United States Patent [19]

Yamanouchi et al.

[11] Patent Number: 5,420,699
[45] Date of Patent: May 30, 1995

[54] PROCESSING APPARATUS FOR PROCESSING INFORMATION ON PHOTOGRAPHIC FILM

[75] Inventors: Kenji Yamanouchi; Takao Misawa; Hiromi Yanatori; Noriyoshi Suzuki; Masanori Makino, all of Hino, Japan

[73] Assignee: Konica Corporation, Tokyo, Japan

[21] Appl. No.: 147,130

[22] Filed: Nov. 3, 1993

[30] Foreign Application Priority Data

Nov. 17, 1992 [JP] Japan .................................. 4-307053
Jan. 19, 1993 [JP] Japan .................................. 5-023759
Jan. 22, 1993 [JP] Japan .................................. 5-009273

[51] Int. Cl.$^6$ ..................... H04N 1/04; G03B 29/00; G03B 27/58
[52] U.S. Cl. ..................... 358/487; 355/28; 355/29; 355/72
[58] Field of Search ............... 358/474, 462, 487, 302, 358/304; 355/28, 29, 72; 354/298

[56] References Cited

U.S. PATENT DOCUMENTS

| | | | |
|---|---|---|---|
| 4,115,981 | 9/1978 | Hell et al. | 53/55 |
| 4,293,215 | 10/1981 | Rosborough, Jr. et al. | 355/40 |
| 4,361,388 | 11/1982 | Micak et al. | 354/106 |
| 4,574,692 | 3/1986 | Wahli | 355/40 |
| 4,920,376 | 4/1990 | Sonoda | 355/72 |
| 5,093,682 | 3/1992 | Hicks | 355/1 |
| 5,227,827 | 7/1993 | Murakami | 354/333 |

*Primary Examiner*—Edward L. Coles, Sr.
*Assistant Examiner*—Kimberly A. Williams
*Attorney, Agent, or Firm*—Jordan B. Bierman; Bierman and Muserlian

[57] ABSTRACT

A processing machine to process information recorded on a photographic film to be processed in the form of plural information. When information contents relating to the same processing item are recorded both in the form of information that is possible to rewrite and in the form of information that is impossible to rewrite, the photographic film is processed based on the form of information that is possible to rewrite.

4 Claims, 14 Drawing Sheets

PROCESSING APPARATUS FOR PROCESSING INFORMATION ON PHOTOGRAPHIC FILM

BACKGROUND OF THE INVENTION

The present invention relates to a method for using processing information recorded on a photographic film and to an apparatus for processing the processing information.

There has been known a photographic system wherein information relating to photographing such as a date of photographing, weather, exposure conditions including the hour and indoor/outdoor photographing, and whether a strobe is used or not are recorded through an optical means, and then the developing and printing processes are carried out based on the information mentioned above in the course of photofinishing.

On the other hand, International Publication No. WO 90/04215 (date; Apr. 19, 1990), Japanese Patent Publication Open to Public Inspection Nos. 287160/1991 and 124665/1992 (hereinafter referred to as Japanese Patent O.P.I. Publication) disclose a method wherein customer information such as an address and a name of a customer who requests photofinishing, a date and a place of purchasing and sizes and the number of prints as well as information of processing conditions are recorded on a photographic film or a cartridge through an optical means or a magnetic means so that the information may be utilized for a market survey of photographic films and an investigation of distribution conditions.

In the course of printing, however, when printing with intentional correction of color balance or the like, for example, without using processing conditions based on photographing information recorded on a film, it is impossible to record the corrected processing information on the film. When making extra prints, therefore, there is a fear that photographic prints differing in image tone are made undesirably.

Further, the invention relates to an image printing apparatus wherein an image photographed on a photographic film is printed on a photographic paper.

For example, there is available an image printing apparatus wherein an area photographed through a camera or the like being designated as an image range to be printed is printed to be the size of ordinary photographing, thereby offering the same effect as that of changing magnification under the condition that a camera lens is not changed. In the case of the above-mentioned printing, efficient printing process can be attained when information necessary for printing are recorded on a photographic film in the course of photographing, the photographic film is developed and photographed images on the photographic film are printed on photographic papers based on additional information.

Though additional information are recorded on a photographic film for the purpose of efficient printing process, some of additional information are not necessarily needed for prints ordered or some of them contain conditions which need to be changed. Therefore, it is necessary, to avoid poor service to customers, to make prints complying with customers' request, without using additional information recorded on a photographic film.

SUMMARY OF THE INVENTION

The first object of the invention is to provide an apparatus for processing information for processing a photographic film wherein the corrected processing information as those mentioned above can be recorded, and prints with constant image quality and image tone can be obtained with the corrected processing information having priority, in the case of reorder.

The second object of the invention is to provide an image printing apparatus capable of printing based on customers' requests without using additional information, as occasion demands.

The third object of the invention is to provide a photograph printing apparatus wherein additional information can be recorded freely on the image side of a print and thereby service to customers can be improved.

In an embodiment attaining the above-mentioned objects, when processing information recorded on a photographic film are in the form of plural information, and when information contents relating to the same processing item are recorded both in the form of information that is possible to rewrite and in the form of information that is impossible to rewrite, the photographic film is processed based on the form of information that is possible to rewrite.

Another embodiment of the invention is provided with a reading means that reads additional information recorded on a photographic film, a printing means that prints a photographed image on the photographic film on a photographic paper, an inputting means through which information of customer's requests for printing are inputted, and a control means that controls the aforementioned printing means for printing based on the additional information mentioned above when the additional information and the information of customer's requests prove to be in accord with each other after being compared, or based on the information of customer's request when they prove not to be in accord with each other.

In the invention, when additional information proves to be in accord with information of customer's request after they are compared, an image photographed on a photographic film is printed on a photographic paper based on the additional information. On the other hand, when the additional information proves not to be in accord with the information of customer's request after they are compared, an image photographed on a photographic film is printed on a photographic paper based on the information of customer's request.

In a photographic printing apparatus for printing an image from a photographic film through exposure for printing of another embodiment of the invention, a dot impact print head and a pedestal therefor are provided so that they face respectively an emulsion side and the side opposite thereto on a photographic paper on which an image on the photographic film is printed, and additional information relating to the image is inputted through a control means and an input means both connected to the dot impact head so that the additional information may be formed as a latent image of pressure fog through pressure printing on the photographic paper.

DETAILED DESCRIPTION OF THE PREFERRED EMBODIMENTS

An example of the invention will be explained as follows, referring to FIGS. 1-8.

As a photographic film related to the invention, there is used a 35 mm film wherein perforations are provided only on one side of the film and a transparent magnetic recording layer is coated on the side opposite to a light-sensitive surface of a film base of the film.

Figure 1:
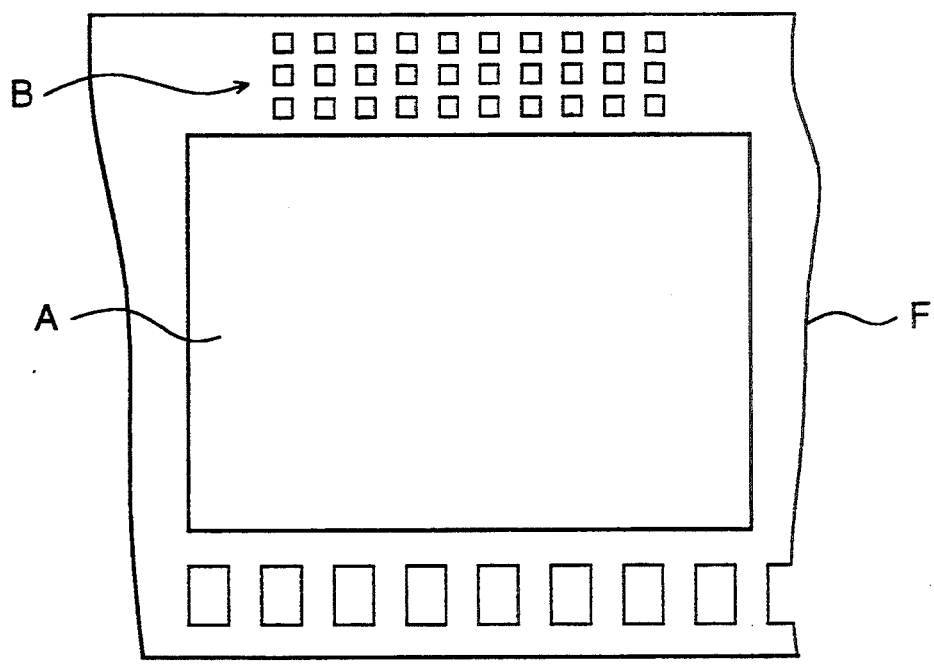
FIG. 1 is an illustration showing the positions of information for photographing recorded on a photographic film.

The photographic film F mentioned above is used for photographing by means of a camera with a built-in photographing information printing device, and image A and image pattern B for information relating to photographing are recorded simultaneously on the film F as shown in FIG. 1.

Since the image pattern B includes information of conditions necessary for printing process such as weather in the course of photographing, time of photographing and whether a strobe was used or not, the photographing information mentioned above is partially used as information necessary for printing process.

Film F which has been exposed totally is delivered to a receiving specialist for photofinishing where customer information including an address and a name of a customer and processing information including a print size, the number of prints and customer's request are recorded magnetically on the aforementioned transparent magnetic recording layer through a processing information recording means called a receiving machine.

Figure 2:
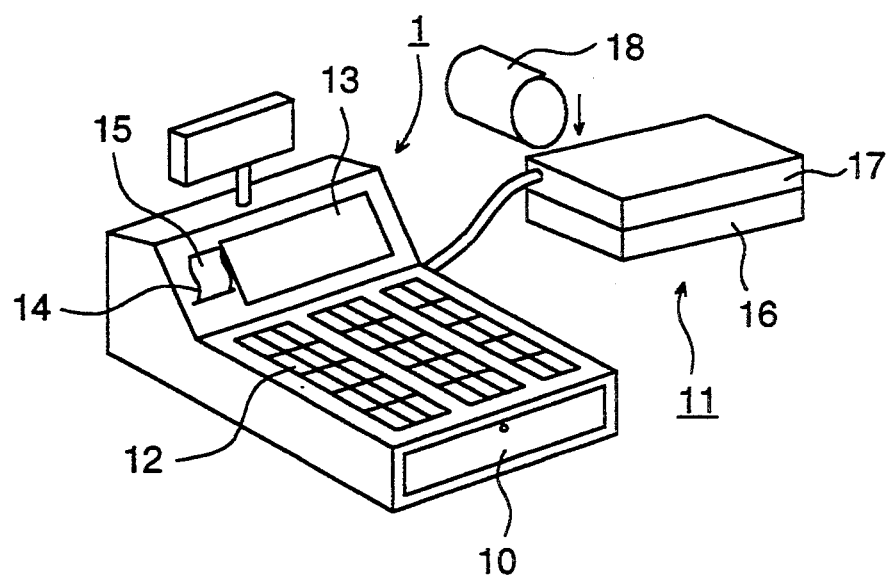
FIG. 2 is a perspective view showing the structure of a receiving machine.

As shown in FIG. 2, processing information recording means 1 is composed of terminal 10 and information read/write equipment 11. On the terminal 10, receiving information, customer information and processing information such as order information or the like are inputted through keyboard 12, thereby the processing information are recorded on a photographic film through the information read/write equipment 11. The inputted processing information are displayed on display 13 and are recorded on sheet 15 by printer 14 to be generated.

On the information read/write equipment 11, processing information recorded on a photographic film can be read, and the processing information thus read are displayed on display 13 similarly to the foregoing and are recorded on sheet 15 by printer 14 to be generated. On the terminal 10, accepting information, customer information and processing information such as request information are recorded on the leading edge portion of the film, for example, and an acceptance slip is issued.

Figure 3:
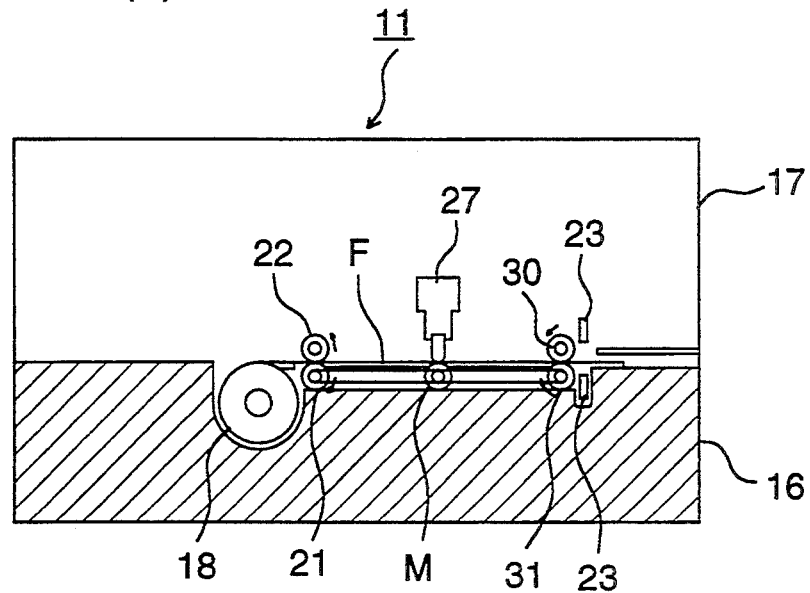
FIGS. 3 (a) and 3 (b) represent respectively a sectional view and a perspective view both showing the structure of an image read/write equipment.
Figure 3:
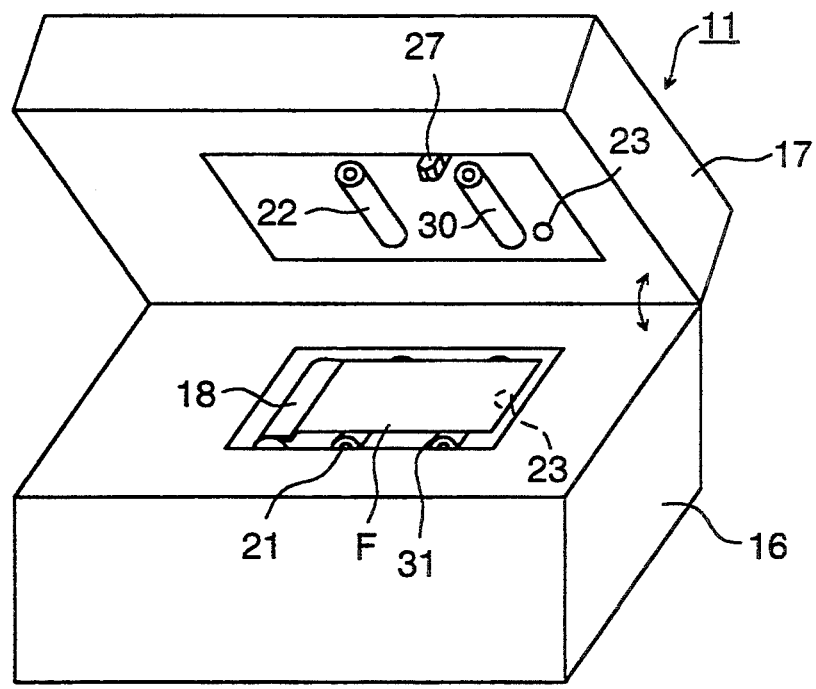

The information read/write equipment 11 is structured as shown in FIGS. 3 (a) and 3(b), and it is composed of its main body 16 on which lid member 17 is provided to be capable of opening and closing. When film cartridge 18 is set on the main body 16 with the lid member 17 staying in its opened position, and then the lid member 17 is closed while the aforesaid condition is kept, the information read/write equipment 11 turns into a dark room as shown in FIG. 3 (a). Photographic film F is drawn out by pull-out roller 21 provided on the main body 16 and by pull-out roller 22 provided on the lid member 17 and then transported by rotation of conveyance rollers 30 and 31. In the vicinity of the conveyance rollers 30 and 31, there is provided film detection sensor 23 which sends detection signals to the terminal 10.

On the lid member 17, there is affixed magnetic head 27 which faces photographic film F when the lid member is closed, and the film F is moved along the surface of the magnetic head for magnetic recording by rotation of the rollers 21 and 31 driven by motor M. Though magnetic recording is mainly performed on the leader portion of the film F, it is also possible to record on each image surface individually.

The magnetic information relating to processing conditions can easily be erased for rewriting, while rewriting of the optical information relating to photographing conditions is impossible.

Figure 4:
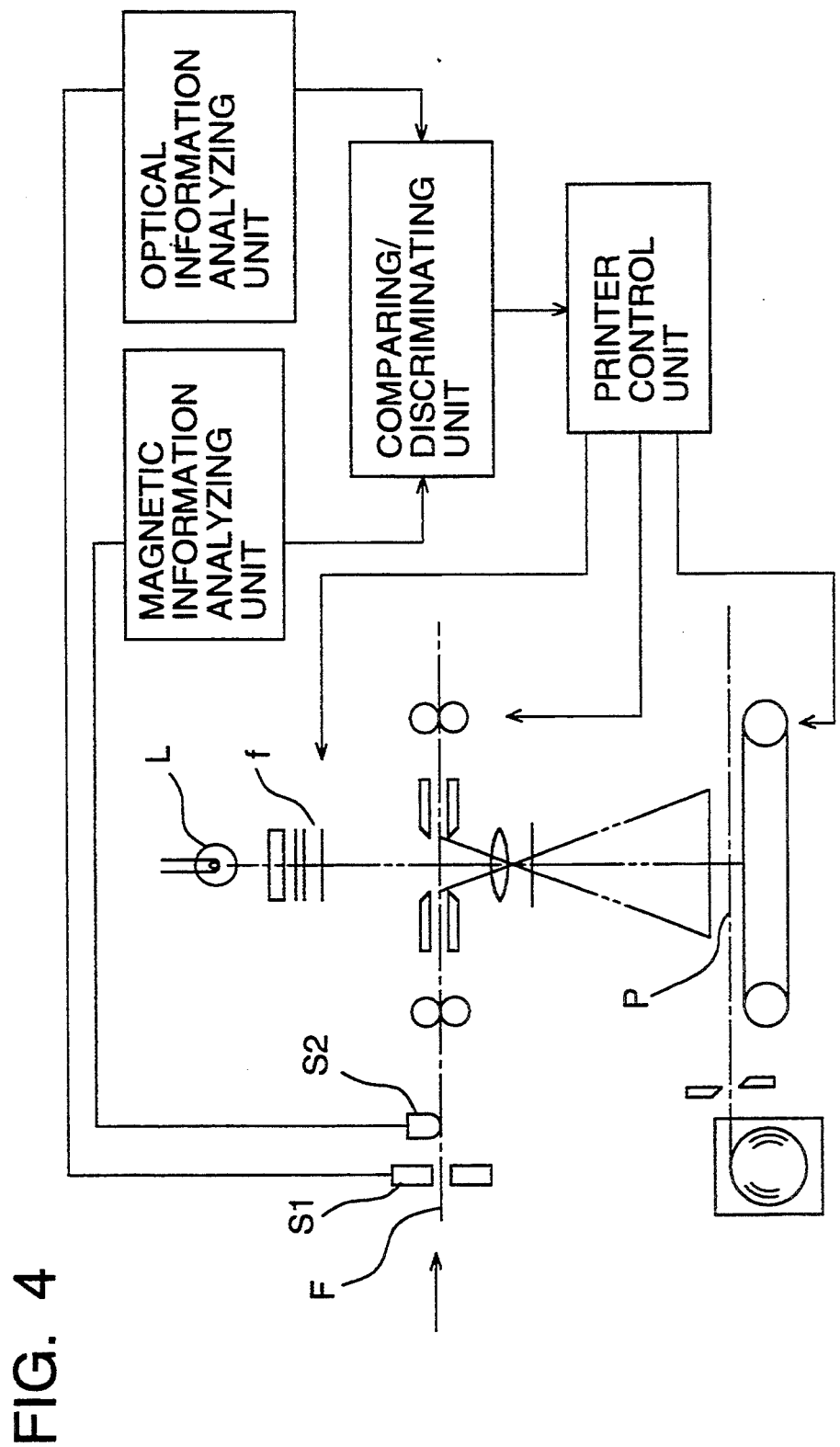
FIG. 4 is an illustration showing a basis of how to utilize information recorded on a photographic film.

After the film F is developed, image A is printed as a positive image on photographic paper P through the print system shown in FIG. 4.

Namely, when the film F is fed in the arrowed direction, optical information sensor S1 reads the aforementioned image pattern B first, the data thereof are sent to an optical information analyzing unit, and, for example, filter f1 is selected so that color correction corresponding to the aforesaid photographing conditions may be made.

Then, magnetic information sensor S2 reads processing information recorded on a transparent magnetic recording layer on the film F by the aforementioned processing information recording means 1, the data thereof are sent to a magnetic information analyzing unit and, for example, specific filter f2 is selected due to the designation of a customer.

Results of selection made by both the optical information analyzing unit and the magnetic information analyzing unit are judged by a comparing/discriminating unit. When they prove to be in accord with each other, a command for printing process based on the optical information is sent to a printer control unit, thereby the filter f1 mentioned above is set on light source L, for example. When they prove not to be in accord with each other, on the contrary, a command for printing process based on the magnetic information is sent to a printer control unit, thereby the filter f2 is set on light source L, for example.

FIGS. 5-8 show examples of detailed arrangement of a processing apparatus used for the aforementioned printing process.

Figure 5:
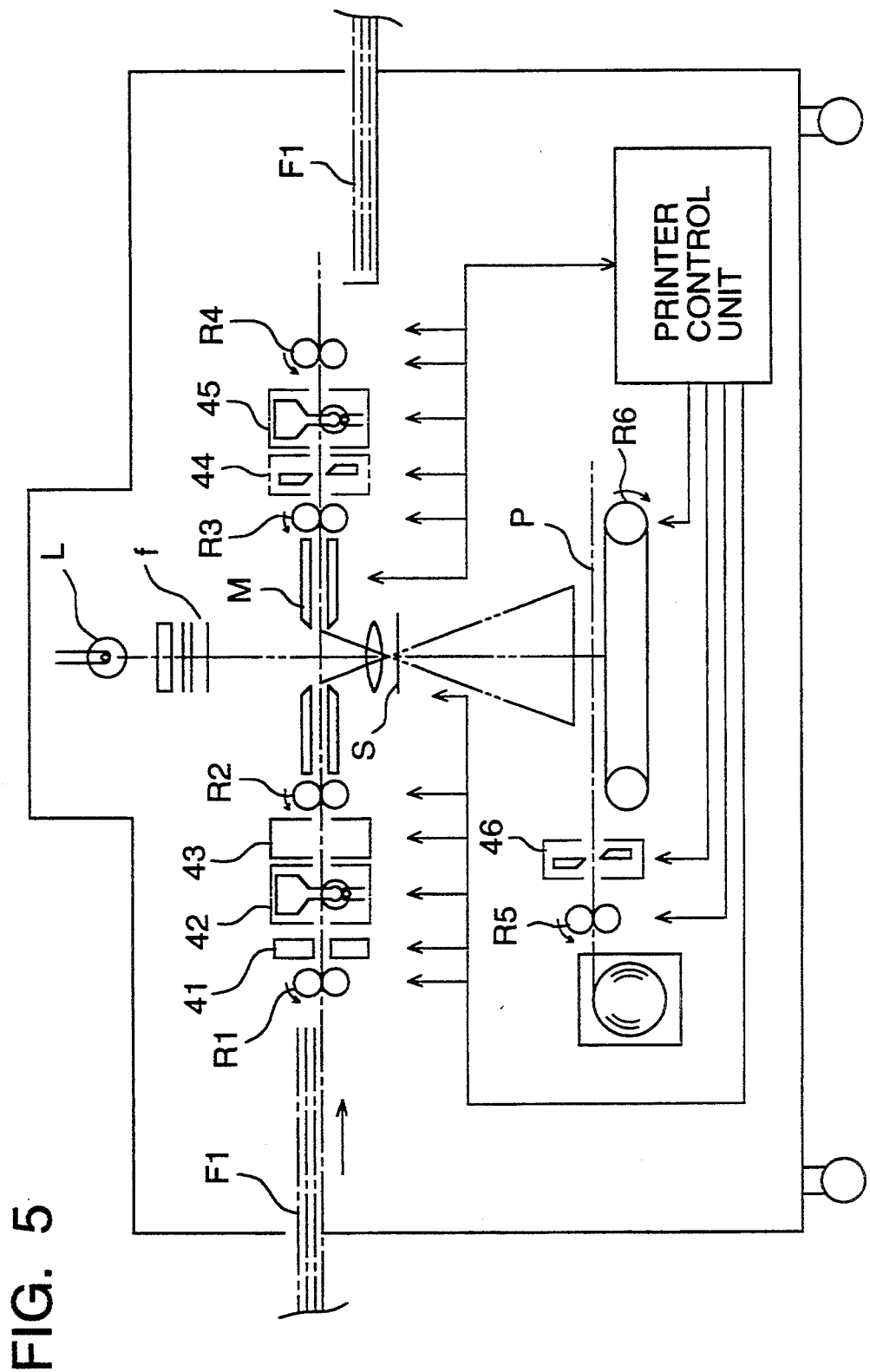
FIG. 5 is a structural diagram of a processing apparatus (first example) for a photographic film of the invention.

FIG. 5 shows an apparatus used for printing process of films F1 each being cut to the length equivalent to 6 frames. The films F1 stacked are fed out in succession on a basis that the bottom one is fed out first by roller R1 rotated by the command from the printer control unit. First, in optical reading head 41, optical information on the aforesaid information pattern B on the film F1 wherein photographing conditions are recorded is read, and then, magnetic information wherein photographing conditions are recorded is read in magnetic reading head 42, thus the aforementioned comparing-/discriminating unit sets exposure conditions.

The film F1 is stopped momentarily by the temporary stop of the roller each time the image A on the film F1 is brought in line with negative film mask M that is positioned at the exposure section in advance, thus, photographic paper P is subjected to exposure through opening and closing of shutter S, and printing is repeated.

The film F1 mentioned above is stopped at the position where its trailing edge arrives at splicer 43, and then is spliced with the succeeding film F1 by the splicer 43 when the succeeding film F1 arrives there to be conveyed again for the continuous printing mentioned above.

The film F1 that has been finished in terms of printing is cut on its spliced portions by film cutter 44 to be restored to plural cut films F1 and ejected after, as occasion demands, magnetic information thereon are erased, rewritten or increased.

A series of operations of units and devices in the processing apparatus mentioned above are performed and controlled by the command from a printer control unit. Further, rotations of rollers R5 and R6 which convey photographic paper P and working of paper cutter 46 are controlled so that they may be synchronized with the operations mentioned above.

Figure 6:
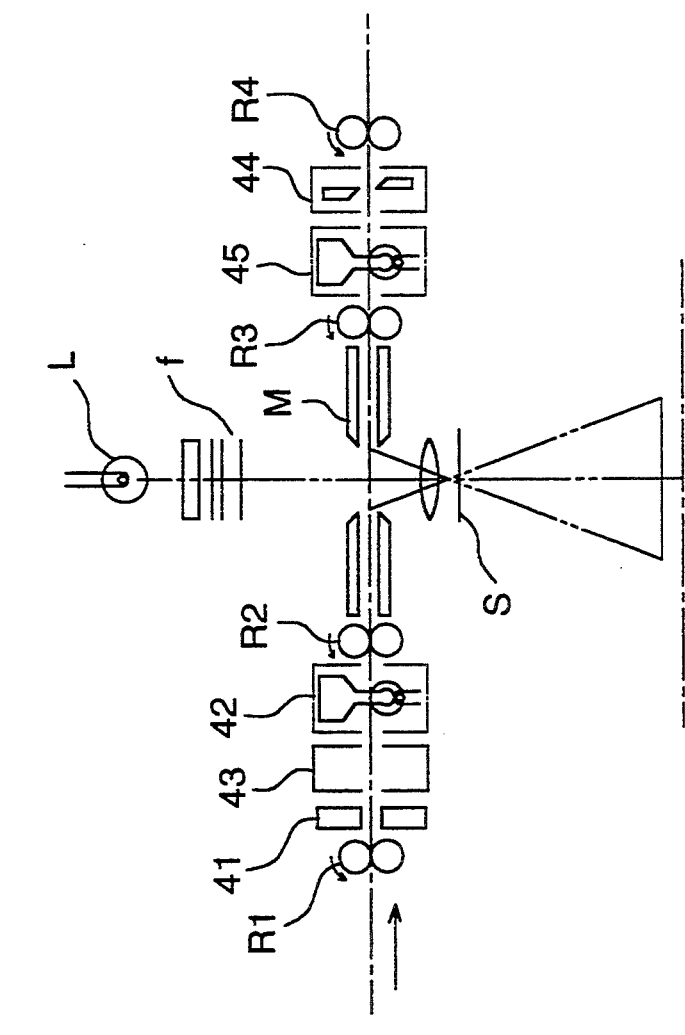
FIG. 6 is a diagram of the main portion of the above-mentioned apparatus.

When the magnetic information reading head 42 and the magnetic information recording head 45 are provided with a mechanism which causes them to retreat when film F1 passes the splicing section, it is possible to arrange so that the magnetic information reading head 42 may be positioned at the downstream side of the splicer 43 and the magnetic information recording head 45 may be positioned at the upstream side of the cutter 44 both in terms of the conveying direction for the film F1 as shown in FIG. 6.

Figure 7:
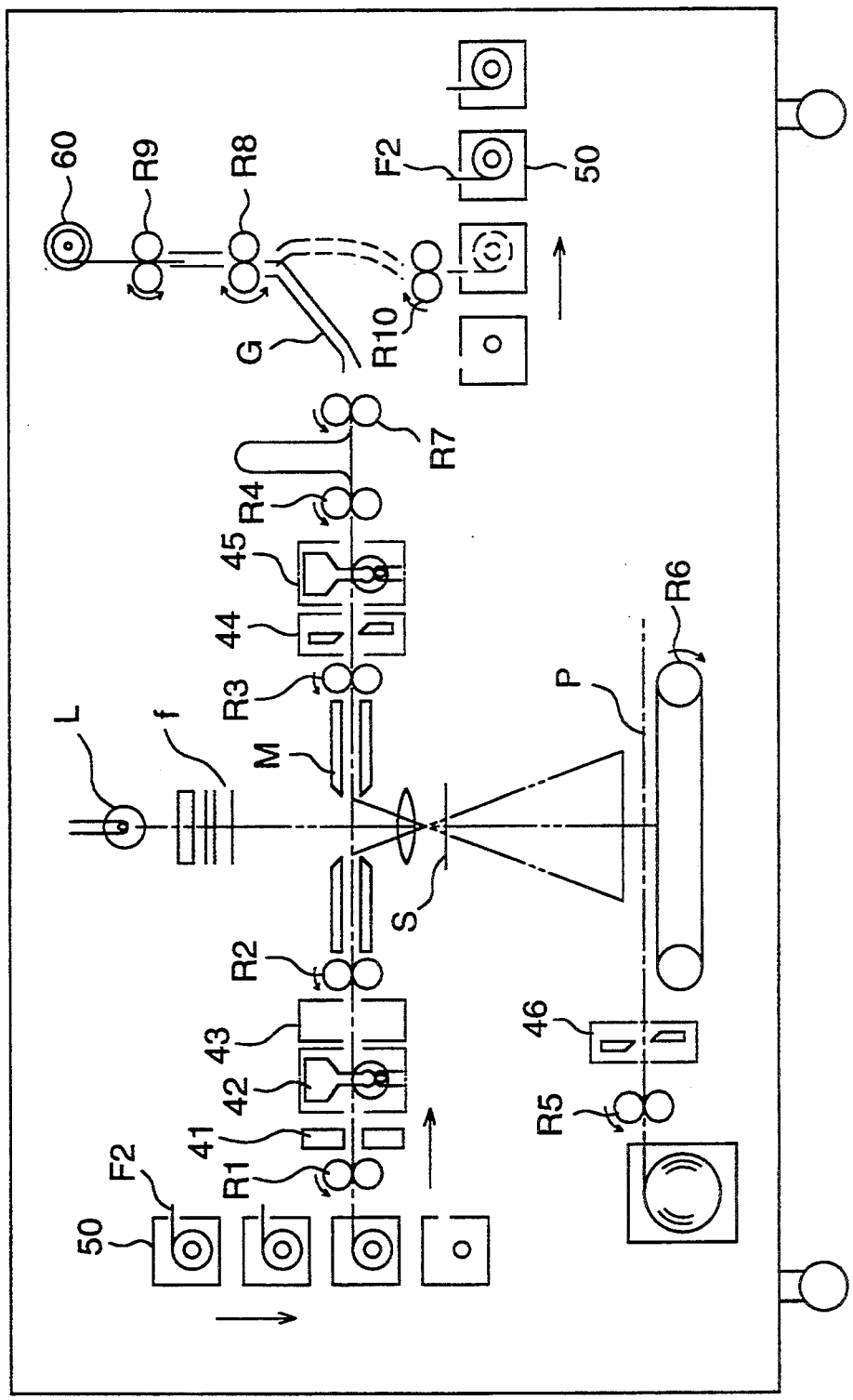
FIG. 7 is a structural diagram of a processing apparatus (second example) for a photographic film of the invention.

FIG. 7 shows an apparatus used for printing process for film F2 wound in a roll shape. Film F2 housed individually in container 50 of a cartridge type falls in succession, and is conveyed continuously by rotating roller R1 from the container positioned at the lower level. Then, optical information and processing information both on the film F2 are read respectively by optical information reading head 41 and magnetic information reading head 42, similarly to the previous example. After that, image A is exposed at the exposure section under the state spliced by splicer 43 so that printing may be repeated.

The film F2 that has been finished in terms of printing is cut on its spliced portions by film cutter 44, the film F2 passes the magnetic recording head 45 and when the trailing edge thereof passes through roller R7, the roller R7 stops rotating, and preceding film F2 only is conveyed to guide member G.

Then, the film F2 is wound round take-up shaft 60 through reversible rollers R8 and R9, and when the trailing edge of the film F2 passes the roller R8, the rollers R8 and R9 rotate reversely and the guide member G moves to the position shown with broken lines simultaneously, thus, the leading edge of the film F2 is conveyed into container 50 through roller R10.

On the other hand, succeeding film F2 forms a loop as shown in the figure when the roller R7 stops rotating, and it is conveyed again by the roller R7 that starts rotating again immediately after the preceding film F2 has been wound into container 50. The roller R7 is accelerated to increase its speed of rotation in the initial stage of the resumption of conveyance therefor to eliminate the loop.

Figure 8:
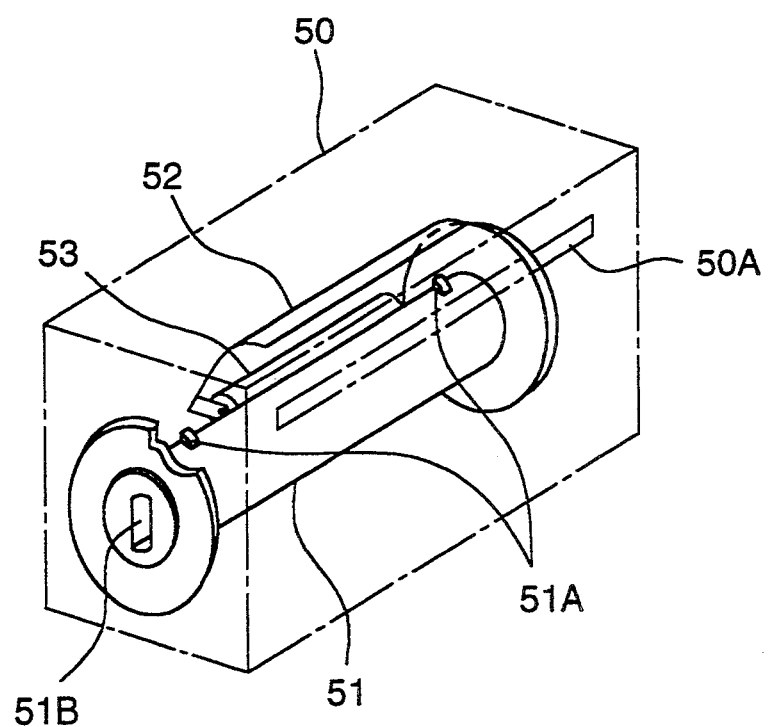
FIG. 8 is a structural diagram of a container for a photographic film.

As shown in FIG. 8, the container 50 supports therein rotatably take-up spool 51 equipped with claws 51A which engage with perforations on the film F2 and with take-up core hole 51B, and guide roller 53 held by elastic member 52 is in pressure contact with the surface of the core.

The take-up spool 51 is driven by a driving shaft that engages with the take-up core hole 51B to keep rotating counterclockwise, and when the film F2 is inserted through inserting inlet 50A of the container 50, the leading edge of the film F2 is sandwiched between the surface of the core and the guide roller 53 so that the perforations may engage with the claws 51A. Therefore, the film F2 wound round the take-up shaft 60 once is taken successively in each container 50 moving in parallel in the arrowed direction to be wound therein automatically.

The container 50 can be used as a cartridge to house film F2 before printing because the trailing edge of the film F2 can be released automatically from the take-up spool 51 when the film F2 wound therein is taken out.

When a film leader is connected between the trailing edge of the film F2 and the take-up spool 51 so that recording of magnetic information for the last frame of the film F2 may be completed before the film leader leaves the take-up spool 51, it is possible to rewind the film F2 into the original container 50 by conveying the film reversely after completion of printing process, and processes of winding the film around the take-up shaft 60 and winding into another container 50 can be omitted.

Incidentally, a PET film whose width is that of the film F2±0.2 mm is appropriate as a material of the film leader, and it is preferable that the length thereof is not less than 150 mm and not more than 250 mm when volume of container 50 and a size of a processing apparatus itself are considered.

Further, it is possible to make the container 50 with plastic materials without using metals at all. Therefore, it is possible to dispose of them collectively without the necessity of disassembling for recovery and disposal of resources.

The present invention offers a method of utilizing processing information for a photographic film wherein photographing information recorded on a film in the course of photographing are not necessarily used and processing conditions corrected after photographic development are used for printing and the processing information are recorded on the film surface to be ready for reprinting. The invention further offers a processing apparatus wherein the above-mentioned system can be realized efficiently with easy operations.

Figure 9:
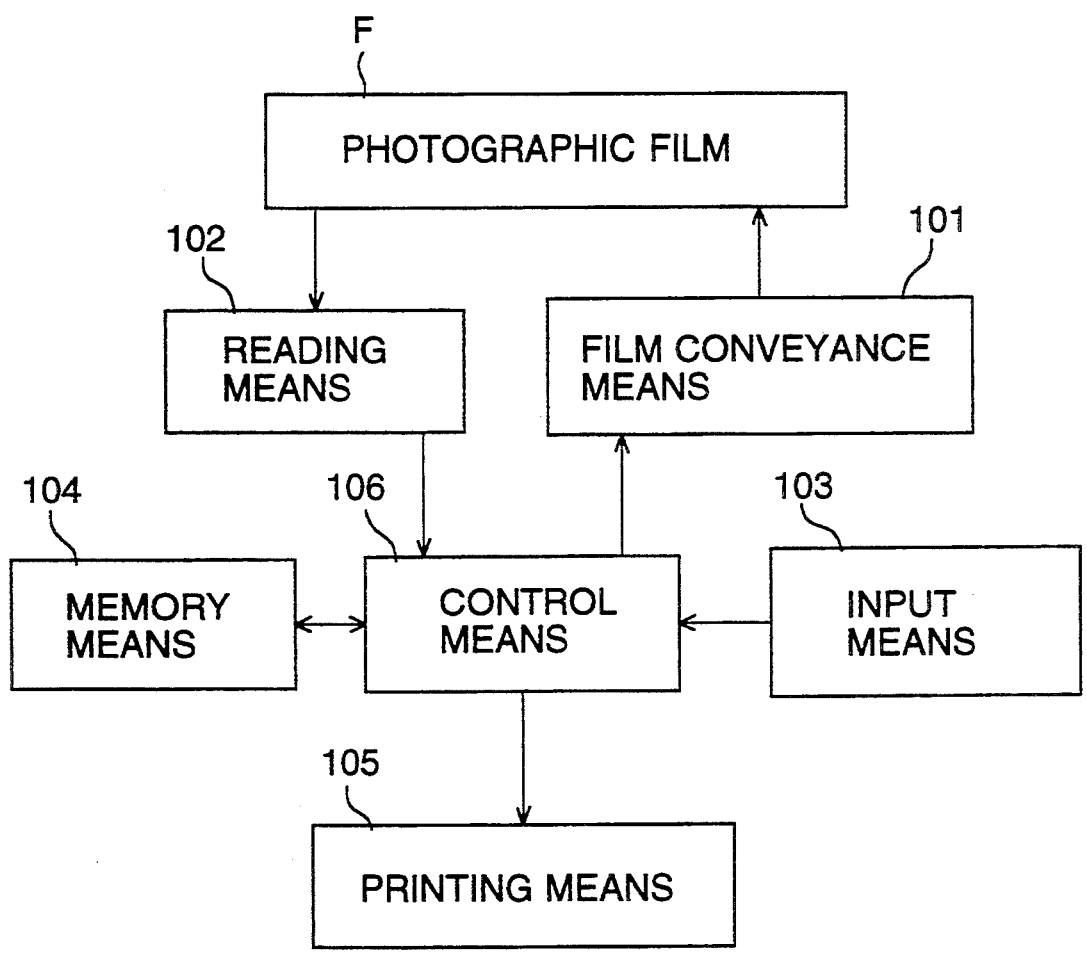
FIG. 9 is a block diagram showing schematic construction of an image printing apparatus.

Next, another example of an image printing apparatus of the invention will be explained in detail as follows, referring to the drawings. First, an example of the image printing apparatus will be explained. FIG. 9 is a block diagram showing the schematic arrangement of the image printing apparatus.

The image printing apparatus is provided with film conveyance means 101, reading means 102, input means 103, memory means 104, printing means 105 and control means 106. The film conveyance means 101 conveys back and forth processed photographic film F on which photographing information or additional information added in the course of photographing are recorded. The photographic film F has thereon photographing information or additional information added in the course of photographing, and a large-sized recording means or a plurality of recording means can not be used for recording the additional information. Therefore, a recording means of small size is used for recording the information on one side of the photographic film.

The reading means 102 reads additional information on the photographic film F conveyed by the film conveyance means 101. The input means 103 inputs requested information for printing. The memory means 104 stores additional information read by the reading means 102 and requested information inputted by the input means 103. The printing means 105 prints an image photographed on the processed photographic film F on photographic paper P. The control means 106 causes the memory means 104 to store requested information from the input means 103. Further, the control means 106 controls the film conveyance means 101 for conveying photographic film F, and causes the memory means 104 to store additional information read by the reading means 102. In the control means 106, additional information and requested information are compared, and when they are in accord with each other, an image photographed on photographic film F is printed on a photographic paper based on additional information, while when they are not in accord with each other, an image photographed on photographic film F is printed on a photographic paper based on requested information.

With regard to the comparison between additional information and requested information in the control means 106, both of additional information and requested information may be stored provisionally in the memory means 104 to be compared later when an image photographed on photographic film F is printed on a photographic paper. Or, it is allowed that additional information is stored in the memory means 104 in advance, and when an image photographed on photographic film F is printed on a photographic paper, requested information is inputted to be compared with additional information, and further, it is allowed that requested information is stored in the memory means 104 in advance, and when an image photographed on photographic film F is printed on a photographic paper, additional information is inputted to be compared with requested information, When an image photographed on photographic film F is printed on a photographic paper based on additional information, wherein an area photographed through a camera or the like mentioned in a prior art being designated as a range for printing is printed to be the size of ordinary photographing, there are two systems of exposure control; one is to control an entire range of photographed image in terms of exposure and the other is control only a part designated to a printing range. The latter case wherein exposure control is made only for a part designated to be a printing range has higher probability of making excellent prints, because exposure control is made for the range that actually becomes a print. Further, in the system wherein exposure control is made only for a part designated to be a printing range, there are considered two methods; one is to mask optically an area other than that designated as a printing range and the other is to mask electrically an area other than that designated as a printing range in the course of exposure control. The method to mask electrically is preferable on the point that an apparatus can be manufactured to be small in size and to be more reliable due to no portions which move mechanically.

As stated above, it is possible to print efficiently by printing an image photographed on a photographic film on a photographic paper based on additional information on an image printing apparatus. In addition, when some of additional information are not necessarily needed for prints ordered or some of them contain conditions which need to be changed, it is possible to print an image photographed on a photographic film on a photographic paper without depending on additional information as occasion demands. Therefore, it is possible to comply with customers' requests in printing, resulting in an improvement in customer service.

Figure 10:
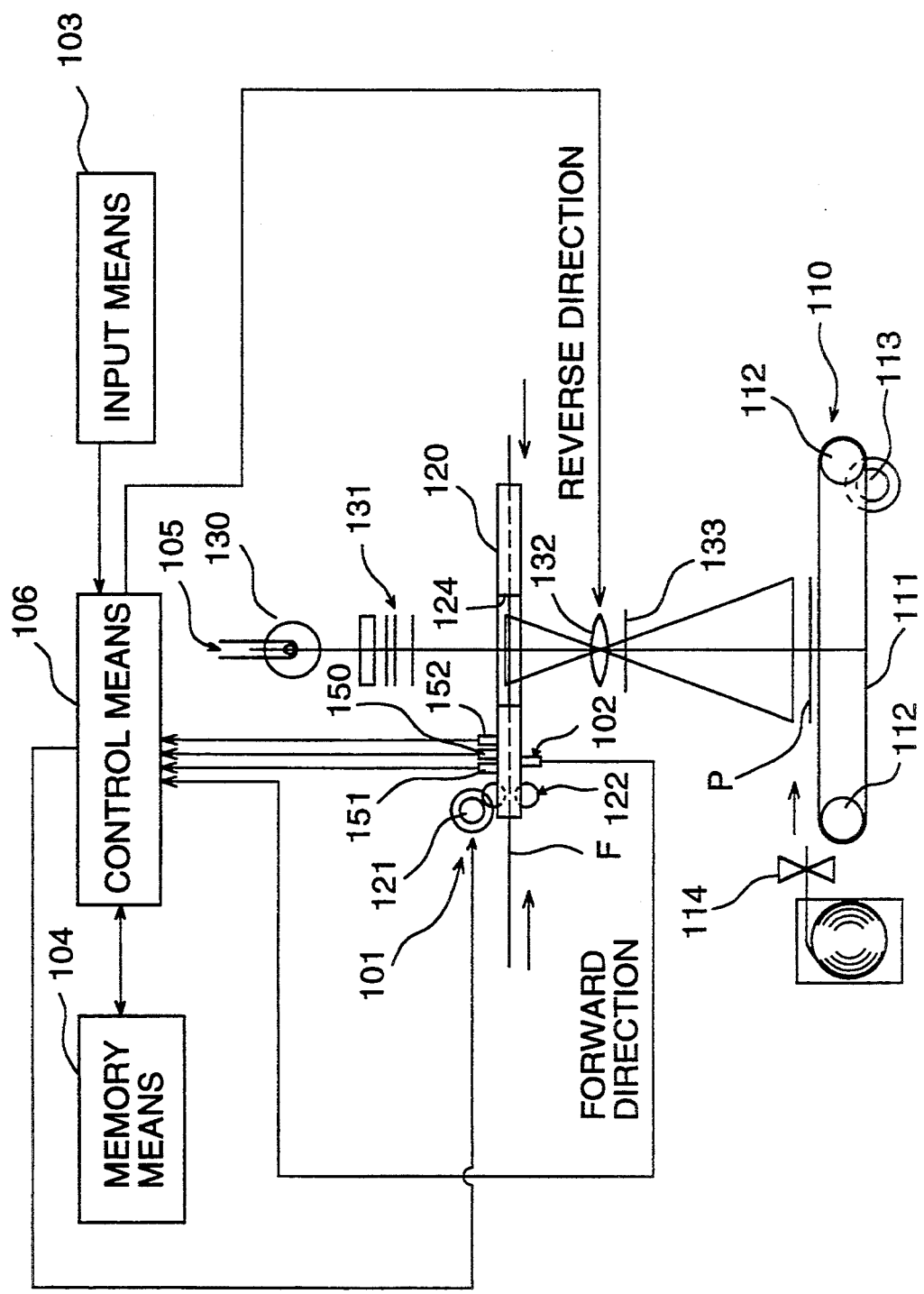
FIG. 10 is a structural diagram of an image printing apparatus.

Next, an example of an image printing apparatus of the invention which is further concrete will be explained in detail as follows, referring to the drawings. FIG. 10 is a block diagram of an image printing apparatus of the invention, FIG. 11 is a top view of a negative film carrier and FIG. 12 is a diagram showing how a processed photographic film is printed.

The image printing apparatus mentioned above is provided with photographic paper transport means 110 that transports photographic paper P, film transport means 101 that transports processed photographic film F, printing means 105 that prints an image on the photographic film F on the photographic paper P, reading means 102 that reads additional information on the photographic film F, input means 103 that inputs requested information for printing, memory means 104 that stores information, and control means 106 that controls printing means 105 based on additional information and on requested information respectively when additional information and requested information prove to be in accord with each other and prove not to be in accord with each other respectively after comparison thereof.

The photographic paper transport means 110 is composed of transport belt 111, rotating shaft 112, and stepping motor 113, and photographic paper P cut by cutter 114 is fed onto the transport belt 111 which transports the photographic paper P. The film transport means 101 is composed of negative film carrier 120, stepping motor 121 and transport roller 122, and processed photographic film F is transported while being guided by the negative film carrier 120. Printing means 105, on the other hand, is composed of light source 130, guide filter 131, lens 132, and shutter 133.

Figure 11:
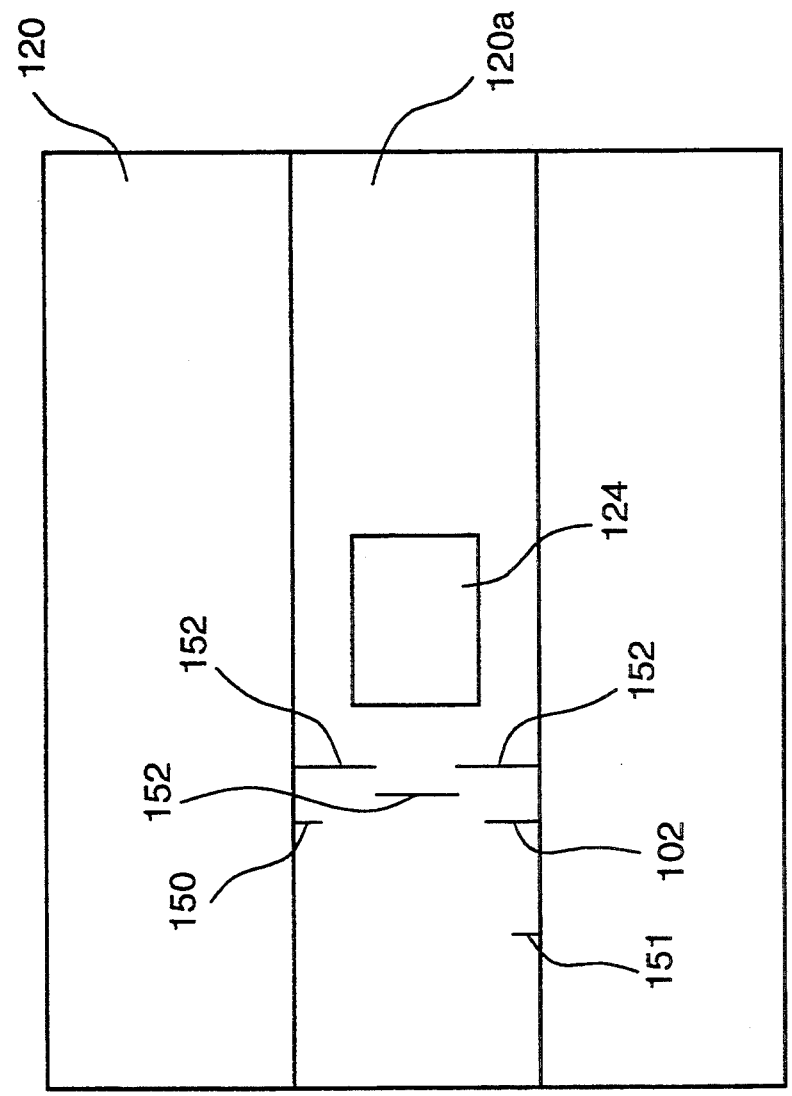
FIG. 11 is a top view of a negative film carrier.
Figure 11:
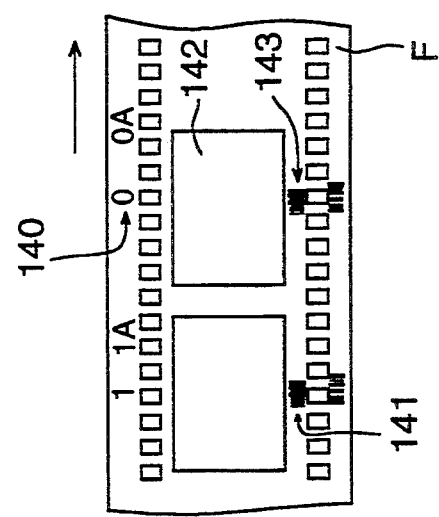
Figure 12:
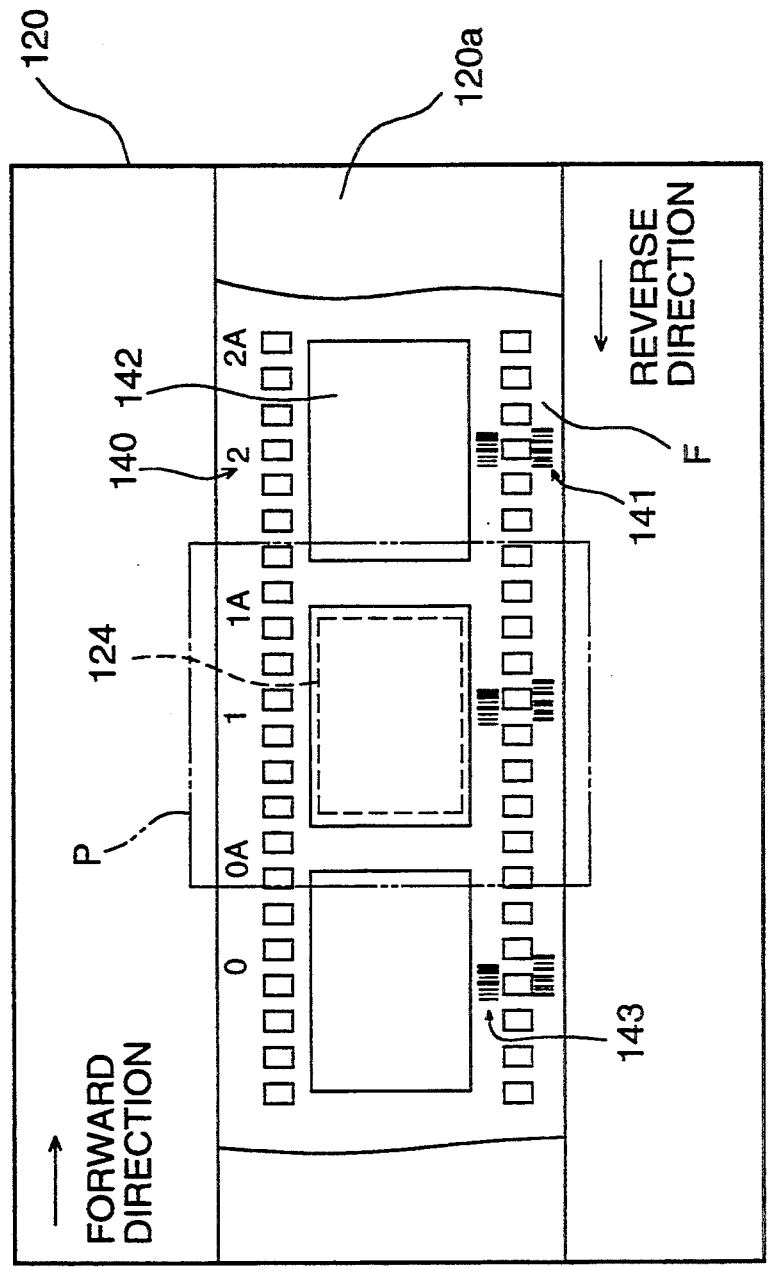
FIG. 12 is a diagram showing how a photographic film is printed.

As shown in FIG. 11, the negative film carrier 120 is provided with film guide portion 120a for processed photographic film F, and exposure stage 124 is formed at the center of the guide portion 120a. On the side where processed photographic film F approaches the exposure position, there are provided frame code sensor 150 that reads frame code 140 of photographic film F, DX sensor 151 that reads DX code 141 of photographic film F, image screen sensor 152 that detects photographed image screen 142 on photographic film F, and reading means that reads additional information such as a print size and a printing magnification.

Processed photographic film F is provided, for example, with a magnetic recording layer on which frame code 140, DX code 141, photographing information such as a print size and a printing magnification or additional information 143 added in the course of photographing are recorded. Photographic film F is inserted into negative film carrier 120, frame code 140 is read by frame code sensor 150 while the photographic film F is being transported, DX code 141 is read by DX sensor 151, photographed image screen 142 on photographic film F is detected by image screen sensor 152, and additional information 143 such as a print size of photographic film F and a printing magnification are read by reading means 102. The additional information 143 read by the reading means 102 are stored in memory means 104, and additional information 143 for each frame to be printed may be either stored corresponding to frame number (for example, 1, 1A, 2) from DX code or frame code or stored with serial numbers covering from the first frame to be printed to the last frame to be printed.

As stated above, additional information on photographic film F on which photographing information or information added in the course of photographing are recorded are read by reading means 102 while the processed photographic film F is being transported by film transport means 101 in one direction, and the additional information are stored in memory means 104. After storing in the memory means 104, control means 106 compares with requested information inputted from input means 103 in advance while the photographic film F is transported by film transport means 101 in the direction opposite to that for reading, and when additional information and requested information are in accord with each other, an image photographed on photographic film F is printed on a photographic paper based on additional information, while when they prove not to be in accord with each other after being compared, an image photographed on photographic film F is printed on a photographic paper based on requested information.

With regard to comparison made in control means 106 between additional information and requested information, both additional information and requested information may be stored provisionally in memory means 104 and then compared when an image photographed on photographic film F is printed on a photographic paper. Or, additional information may be stored in memory means 104 in advance, and then compared with requested information which are inputted when an image photographed on photographic film F is printed on a photographic paper. Incidentally, the foregoing may be applied not only to sheet photographic papers but also to roll photographic papers.

As stated above, in the invention, when additional information and requested information are compared and they prove to be in accord with each other, an image photographed on a photographic film is printed on a photographic paper based on additional information, while when they prove not to be in accord with each other after being compared, an image photographed on a photographic film is printed on a photographic paper based on requested information, and it is also possible to print based on requested information without depending on additional information. Therefore, it is possible to print complying with customers' request, resulting in an improvement in customer service.

Figure 13:
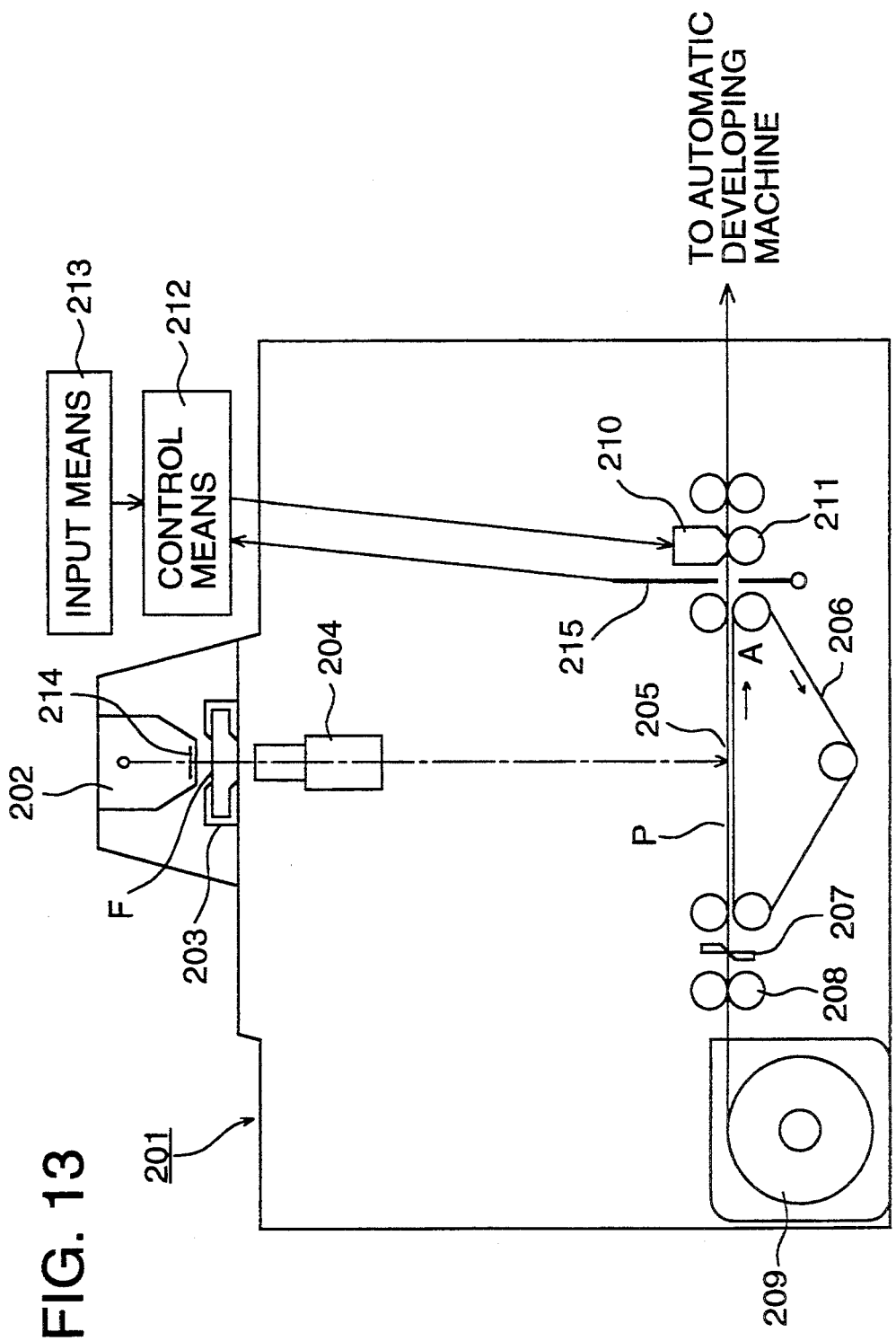
FIG. 13 is another structural diagram of a photographic printing apparatus of the invention.

Next, an example of a printing position in the invention will be explained as follows, referring to the drawings attached hereto. FIG. 13 is a structural diagram showing an outline of a photographic printing apparatus in the example.

On the top of photographic printing apparatus 201, there are provided light source 202 and negative film carrier 203, and in the middle portion thereof, there is provided lens 204 for projection, while at the lower portion thereof, there is provided exposure portion 205 consisting of transport means 206 and cutter 207 as well as feed-out roller 208 both positioned at the upstream side of the transport means 206. Thereby, photographic paper P fed out of photographic paper magazine 209 is fed out by predetermined length to be positioned, cut by cutter 207, further transported by transport means 206 to the right so that the cut photographic paper may be positioned at the center of the exposure portion 205. Then, negative film F is examined so that exposure conditions may be determined, and shutter 214 provided at the outlet on the lower portion of the light source 202 is opened and closed so that transmitted light image of the film F may be projected on the photographic paper P for exposure for printing. Then, the photographic paper P is driven by transport means 206 in the arrowed direction A to move to the right. Then, a latent image is formed by dot-impact print head 210 on the photographic paper P as dot-pressure printing caused by additional information inputted in input means 213, coded by control means 212 and impressed. The photographic paper is further transported to the right to enter an unillustrated automatic developing machine where the latent image is developed to be a visible image.

With regard to the position of printing made by the dot impact print head 210 on the photographic paper P, it is determined through the method wherein detection means 215 detects the leading edge of the photographic paper P and printing is started from the point which corresponds to a predetermined count number of clock pulses counted from the detection made by the detection means 215 in accordance with the speed of transporting a photographic paper.

A printing area on photographic paper P will be explained in the following. In a printing method wherein white margins are formed so that they surround an image area on the photographic paper P, characters and others are printed in color images through the method of the invention on the white margins.

With regard to a printing method wherein white margins are not formed on photographic paper P, there are two methods which include one wherein the area to be printed with characters is masked (light-shielded) in advance in the course of exposure for image printing and then a dot-impact printing head is used for printing, and the other wherein a dot-impact printing head is superposed on an image for printing without masking. Though the method employing masking has an advantage that printed images are sharp, it can not be avoided that unnatural image areas are caused because an image on the masked area is eliminated. Therefore, the method employing masking is not suitable for some applications.

On the other hand, when a dot-impact printing is superposed on an image for printing without masking, images are not necessarily sharp due to broad variation such as printing caused by coloring or printing caused by desensitizing depending on density of images on the area. However, original images are not eliminated. Therefore, the above-mentioned method is effective for a certain application.

In any case, images are not so sharp as those made through printing with ink. However, due to an advantage that no harm is caused by ink and due to the printing of a lightsensitive material incorporated with a photographic image, the foregoing is preferable as additional information of the image.

Figure 14:
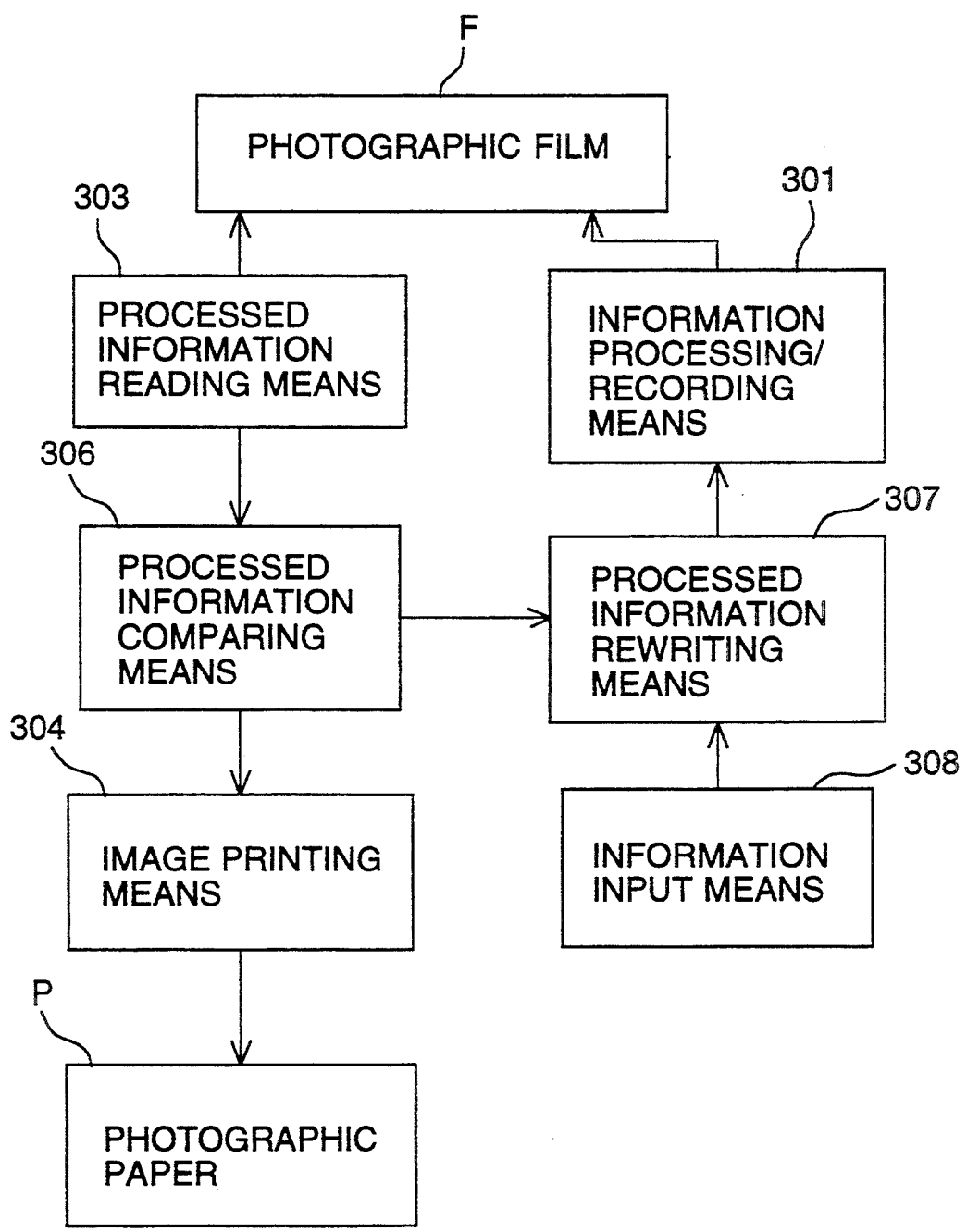
FIG. 14 is still another schematic structural diagram of a photographic processing apparatus.

Still another example of each photographic processing method and each photographic processing apparatus will be explained next. FIG. 14 is a schematic block diagram of a photographic processing apparatus of the invention. The photographic processing apparatus is provided with processing information recording means 301, processing information reading means 303, processing information comparing means 306, processing information rewriting means 307 and image printing means 304. The processing information reading means 303 reads processing information recorded magnetically on a magnetic recording layer on processed photographic film F. The processing information comparing means 306 compares processing information read by the processing information reading means 303 with new processing information given from information input means 308. The processing information rewriting means 307 rewrites read processing information to new processing information through processing information recording means 301 when the new processing information is different from the read processing information. The image printing means 304 prints an image photographed on photographic film F on a photographic paper based on new processing information rewritten by the processing information rewriting means 307.

Figure 15:
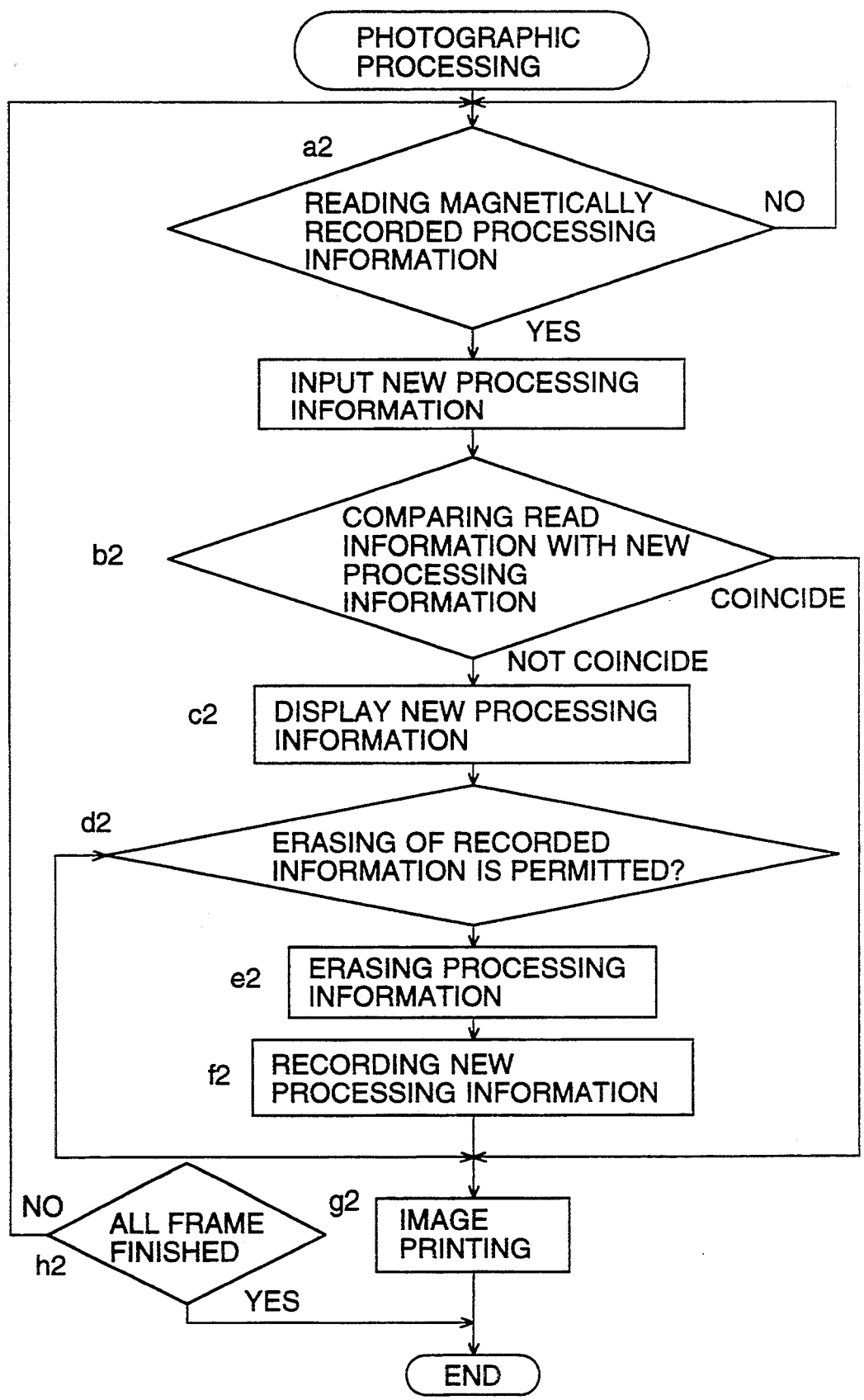
FIG. 15 is a process diagram for photographic processing.

FIG. 15 is a diagram of processes for photographic processing of the invention. In step a2, processing information recorded magnetically on a magnetic recording layer on a processed photographic film is read, and in step b2, the read processing information is compared with new processing information given from information input means 308. When the new processing information is different from the recorded processing information, that new processing information is displayed in step c2. In step d2, the magnetically recorded processing information is checked whether it is permitted to be erased or not in this specified system, and when it is impossible to erase, the step goes back to g2. When it is possible to erase the different recorded information in step d2, this recorded processing information is erased in step e2, and it is rewritten to new processing information in step f2. Based on the new processing information, an image photographed on a photographic film is printed on a photographic paper in step g2. After that, the photographic film is checked whether images on all frames thereon have been finished in photographic printing or not. When they have not been finished, the sequence goes back to step a2, while when they have been finished, the sequence of the photographic printing is terminated.

Processing information recording means 301, processing information reading means 303, processing information comparing means 306 and processing information rewriting means 307 all of the photographic processing apparatus can be composed of terminal equipment 10 and information read/write equipment 11 shown respectively in FIG. 2 and FIG. 4. Magnetic head 27 of the information read/write equipment 11 reads processing information recorded on photographic film F and indicates it on display 13 of the terminal equipment 10, or outputs it to printer 14. This processing information outputted is compared with new processing information in the terminal equipment 10. When the new processing information is different from the read processing information, new processing information is inputted through the operation of the terminal equipment 10, and it is rewritten by magnetic head 27 of the information read/write equipment 11.

As stated above, processing information is recorded on a photographic film used for photographing in a camera, the photographic film is processed, and images photographed on the processed photographic film are printed on a photographic paper based on processing information. Therefore, it is not necessary that processing information such as requested information in an acceptance envelope is inputted again in a magnetic tape or a floppy disk, or an operator operates manually, and all steps from development of a photographic film to printing thereof can be automated, and erroneous photographic printing can be prevented.

Furthermore, processing information recorded magnetically on a magnetic recording layer on a processed photographic film is read, the read processing information is compared with new processing information given from an information input means, the read processing information is rewritten to the new processing information when they differ each other, and images photographed on the photographic film are printed on a photographic paper based on the new processing information. Therefore, it is not necessary that processing information such as requested information in an acceptance envelope is inputted again in a magnetic tape or a floppy disk, or an operator operates manually, and printing process can be automated, and erroneous photographic printing can be prevented.

In addition, processing information includes at least one of acceptance information, customers' information and requested information, and processing information complying with customer's request is recorded on a photographic film. Therefore, it is possible to print an image photographed on the photographic film on a photographic paper without an error.

What is claimed is:

1. A processing apparatus for processing information recorded on at least one photographic film to be processed, said processing information being recorded in a plurality of information forms, including a non-rewritable information form and a rewritable information form, said apparatus comprising:

(a) a first reader for reading information in said non-rewritable information form;

(b) a second reader for reading information from said rewritable information form; and (c) a control for comparing information from said non-rewritable information form and said rewritable information form so that said photographic film is processed based on process data read from said non-rewritable information form, when no conflicting information is read from said rewritable information form, and said photographic film is processed according to said rewritable information form when conflicting data directed to the same processing items have been recorded in both said rewritable information form and in said non-rewritable information form.

2. The processing apparatus of claim 1 wherein said photographic film is in the form of cut film portions, said processing apparatus further comprising:
  (a) a splicer for splicing together said film portions to form spliced photographic film; and
  (b) a cutter for dividing said spliced film at each splice whereby said film portions are restored;
  wherein said spliced film is processed based on said information forms and is then divided into a plurality of photographic films and ejected from said apparatus.

3. The processing apparatus of claim 1 wherein said photographic film is in the form of a film roll, said apparatus further comprising:
  (a) a plurality of containers, each adapted to accommodate one roll of said photographic film therein;
  (b) a splicer for splicing together a plurality of said rolls to form at least one spliced photographic roll; and
  (c) a cutter for dividing said spliced rolls at each splice to restore said spliced rolls to said one roll;
  wherein, after each roll of photographic film has been spliced by said splicer, said spliced roll is processed based on said information forms, and is then cut and ejected from said apparatus into each of said plurality of containers.

4. The processing apparatus of claim 3 wherein said plurality of containers each further comprise:
  (a) a take-up spool having claws with which perforations in said roll are engaged; and
  (b) a pressing roller, urged into pressure contact with a circumferential surface of said take-up spool,
  wherein, when each said roll is inserted into each of said containers, a leading edge of each said roll is automatically engaged by said take-up spool, and
  wherein, when each said roll is taken from each of said containers, a trailing edge of said film is automatically released from said take-up spool.

* * * * *